United States Patent [19]

Jabor

[11] 4,339,696
[45] Jul. 13, 1982

[54] LIGHT SWITCH DELAY CIRCUIT

[76] Inventor: Tony Jabor, 9001 Galena, El Paso, Tex. 79904

[21] Appl. No.: 160,095

[22] Filed: Jun. 16, 1980

[51] Int. Cl.³ .............................................. H05B 39/00
[52] U.S. Cl. .................................... 315/360; 307/141; 315/199; 315/362; 361/196
[58] Field of Search ............... 315/194, 199, 209, 291, 315/307, 360, 362, DIG. 4; 361/196–198; 307/141, 293, 294

[56] References Cited

U.S. PATENT DOCUMENTS 3,732,484  5/1973  McKenna ........................... 307/141

Primary Examiner—Eugene R. LaRoche
Attorney, Agent, or Firm—Arthur F. Zobal

[57] ABSTRACT

A delay circuit comprising two leads adapted to be connected across a light switch for delaying the turn off of a light bulb after the switch has been turned off. A silicon controlled rectifier (SCR) is connected across the two leads for applying power to the bulb when the SCR is on. A capacitor is connected to one of the leads for controlling circuitry coupled to the gate of the SCR for turning the SCR on for a given time period following the opening of the switch. A quick discharge circuit is provided for rapidly discharging the capacitor when the switch is closed.

10 Claims, 4 Drawing Figures

LIGHT SWITCH DELAY CIRCUIT

FIELD OF THE INVENTION

The present invention relates to a circuit for delaying the turn off of a light bulb after the light switch is turned off.

DESCRIPTION OF THE PRIOR ART

A need exists in homes for a device for delaying the turn off of a light bulb after the light switch is turned off. Such devices would find application in bedrooms, bathrooms, garages, for outdoor lights, etc. U.S. Pat. No. 4,082,961 discloses such a device, however, the device of this patent has disadvantages in that it does not have a quick discharge circuit nor does it have an adjustable time delay. Moreover, it appears that for a meaningful delay period the capacitor 94 would have to be a large capacitor or more than likely it would have to be an electrolytic capacitor which has disadvantages due to leakage current.

SUMMARY OF THE INVENTION

It is an object of the present invention to provide an improved circuit for delaying the turn off of a light bulb after the light switch is turned off.

The circuit has a quick discharge circuit as well as means for adjusting the time delay. In addition, it is small enought to fit in the same electrical box that houses the light switch and does not require connection to the neutral side of the power line.

DESCRIPTION OF THE PREFERRED EMBODIMENTS

Figure 1:
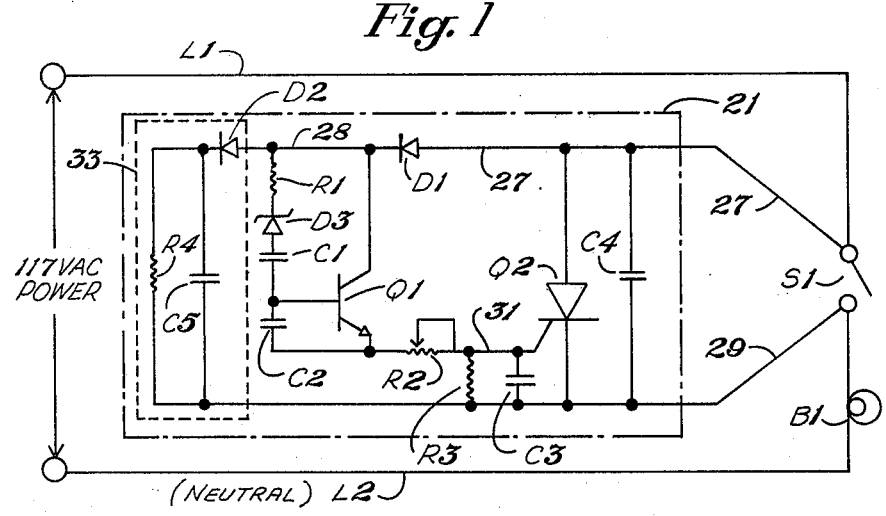
FIG. 1 is an electrical schematic of one embodiment of the present invention.

Referring to FIG. 1, the light switch delay circuit is enclosed by dashed line 21. Switch S1 is a typical household light switch connected to A.C. voltage power leads L1 and L2 and B1 is an incandescent household light bulb. Leads 27 and 29 of the circuit 21 are connected to the two terminals respectively of switch S1. A silicon controlled rectifier Q2 has its anode connected to lead 27 and its cathode connected to lead 29. Capacitor C4 also is connected across the leads 27 and 29. A diode D1 is connected in lead 27 and an NPN transistor Q1 has its collector connected to lead 28. Also coupled to lead 27 by way of lead 28 is a resistor R1, a Zener Diode D3 and a timing or charging capacitor C1. The emitter of transistor Q1 is connected to the gate of SCR Q2 by way of lead 31 which includes a variable resistor R2. A capacitor C2 is connected between the base and emitter of Q1 and resistor R3 and capacitor C3 are connected between lead 31 and lead 29. Circuit 33 is a quick discharge circuit which comprises diode D2 connected to lead 28 and resistor R4 and capacitor C5 connected in parallel to the cathode of D2 and to lead 29.

When S1 is closed to turn "ON" the light, the light switch delay circuit 21 is shorted out through S1, and has no effect in controlling the lamp B1. When S1 is opened to turn "OFF" the light, the light switch delay circuit 21 is no longer shorted out, and it begins to control B1 in the following manner. As the voltage on power line L1 goes through the beginning of the positive portion of its cycle with reference to L2 (positive half cycle), capacitor C1 begins to charge through diode D1, resistor R1, diode D3, the base emitter-junction of transistor Q1, resistor R2, gate-cathode of SCR Q2, lamp B1 and L2. This charge current is quite small and its most noticeable effect is to turn Q1 "ON". Current will now flow through collector-emitter of Q1, R2, gate-cathode of Q2, turning Q2 "ON". Once Q2 is turned "ON" it will stay "ON" throughout the remainder of the positive half cycle.

When Q2 turns "ON" current will flow from L1 through the anode-cathode of Q2, B1 and L2 turning "ON" the lamp for the rest of the positive half cycle. Also because Q2 is now turned "ON", C1 charge current ceases, and Q1 is turned "OFF" for the remainder of this positive half cycle.

At the end of the positive half cycle, the line voltage reverses and the voltage on L1 goes negative and in so doing Q2 is forced to turn "OFF", and likewise B1. Throughout the negative portion of the cycle (negative half cycle), Q2 and B1 are "OFF". During the negative half cycle, D1 will block any reverse current attempting to flow through the circuitry of Q1, and also prevent C1 from discharging.

On the next positive half cycle of the voltage on L1 and each succeeding positive half cycle thereafter, the charging process of C1 is repeated until C1 accumulates a full charge. At this tme, charge current ceases to flow and Q1 can no longer turn "ON". Q2 remains "OFF" and therefore B1 goes "OFF".

Because of the accumulating nature in the charging of C1, each succeeding positive half cycle is phase delaying the turn "ON" of Q1 and Q2. That is to say that Q2 is being turned "ON" at a later time period, with respect to the beginning time of each positive half cycle. This phase delay continues until C1 charges to the peak value of its applied voltage, at which time Q1 can no longer be turned "ON", and therefore, Q2 will not turn "ON" again upon completing the final positive half cycle.

The overall effect on lamp B1 is that as soon as S1 is opened, B1 will dim to approximately half power, and from that point on B1 will continue to get dimmer throughout its entire time delay interval. At the end of the timing interval, B1 will be down to approximately one quarter power, at which time it turns "OFF".

Because C1 is being charged in small increments of each positive half cycle of L1, relatively long time delays can be realized with a given value of C1. If these charging increments are made larger, C1 will charge sooner and the time delay period will be shorter. Increasing the value of R2, will make the charging increments larger. Thus R2 becomes a means of adjusting the delay period.

Once S1 has been opened to turn "OFF" B1 and the timing interval is over, C1 will remain in a charged condition for as long as S1 is opened. If S1 is now closed, C1 cannot discharge due to the blocking action of D1. Eventually, due to leakage current, C1 will slowly discharge providing S1 remains closed. A quick discharge of C1 is desirable when S1 is closed so that the whole timing period can be repeated shortly after S1 is closed. The quick discharge circuit 33 is intended for this purpose. This circuit has a negligible effect on the timing portion (circuitry of Q1) of the light switch delay circuit, when a timing interval is taking place. The discharge circuit 33 functions at the time S1 is closed to turn "ON" the light.

While a timing interval is taking place, capacitor C5 is being pulse charged in the same manner as C1. During portions of the timing interval when C5 is not being charged (when Q2 is "ON" or when L1 goes negative), C5 discharges a slight amount through resistor R4, however the R4, C5 time constant is large enough such that the net effect is to allow C5 to accumulate a charge during the timing interval. Blocking diode D2 prevents C5 from discharging through other parts of the circuit.

When the timing interval ends because C1 becomes fully charged, C5 will reach an equilibrium between its discharging through R4 and the replenishment of its charge with each positive half cycle of the voltage on L1. The net charge on C5 is sufficient to keep diode D2 reverse biased, except when C5 is being replenished, and therefore prevents C1 from trying to discharge through R4 during and after the timing interval. C5 will remain in this charged state as long as S1 remains open (light "OFF").

When S1 is closed to turn the light "ON", C5 can no longer have its charge replenished because S1 is shorting out the light switch delay circuit, and C5 begins to discharge through R4. As C5 is discharging, D2 will become forward biased due to the charge on C1 and therefore C1 also begins to discharge through R4. In a matter of several seconds, C5 and C1 are discharged to their initial state, and the timing interval is ready to begin again, whenever S1 is opened to turn the light "OFF".

Zener diode D3 is placed in the circuit to insure that C5 will charge to a higher voltage than C1, thus providing a larger voltage to reverse bias D2, and resulting in a higher noise immunity discharge circuit. Resistor R1, and capacitors C2, C3 and C4 are also used to provide a larger degree of noise immunity to other parts of the circuit. Resistor R3 is a gate termination recommended by manufactures of SCR's such as Q2.

Figure 2:
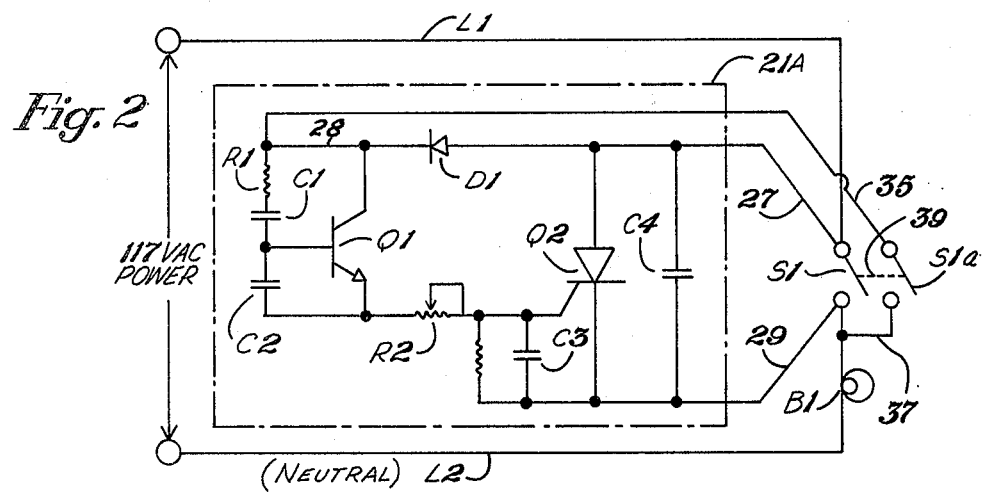
FIG. 2 is an electrical schematic of the embodiment of FIG. 1 with a different type of quick discharge circuit.

Referring to FIG. 2, the light switch delay circuit 21A is the same as circuit 21 except that an alternative quick discharge circuit has been substituted for circuit 33. The alternative quick discharge circuit comprises an auxiliary switch S1a having one terminal connected to lead 28 (between C1 and D1) by way of lead 35 and the other terminal connected to lead L2 by way of lead 37. Switches S1 and S1a are ganged together by way of connection 39.

Effectively S1 now becomes a double pole-single throw switch, however, auxiliarly switch S1a does not carry load current. Its sole function is to discharge C1.

When S1 is closed to turn the light "ON", S1a likewise closes and C1 will discharge through R1 and auxiliary switch S1a in a very short time; setting up the light switch delay circuit for a timing interval whenever S1 is opened to turn "OFF" the light. This method of discharging C1 can lend itself into making the light switch delay circuit an integral part of switch S1. The use of auxiliary switch S1a would eliminate components C5, D2, D3 and R4 shown in FIG. 1, thus simplifying the circuit, and improving reliability.

Figure 3:
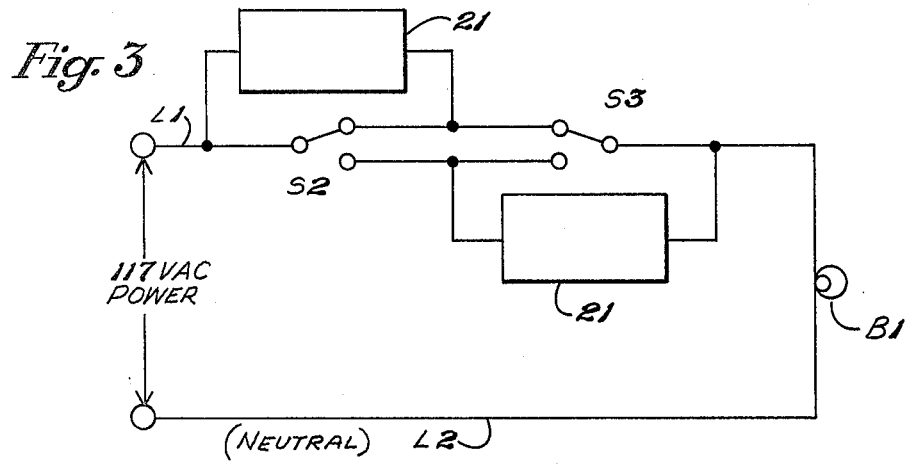
FIG. 3 illustrates two of the circuits of FIG. 1 connected with two three-way switches.

FIG. 3 illustrates the use of two light switch delay circuits 21 which can be used with three-way switch arrangement S2 and S3.

Figure 4:
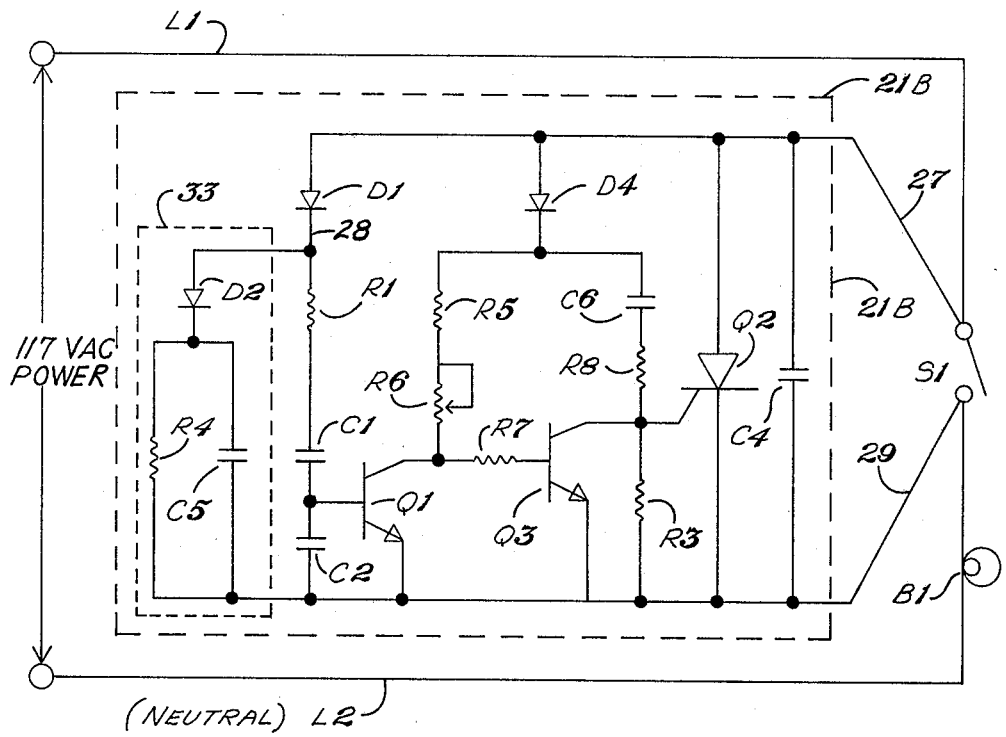
FIG. 4 is an electrical schematic of a preferred embodiment of the present invention.

Referring to FIG. 4, the light switch delay circuit 21B employs the same components of circuit 21 except that components C3, D3 and R2 have been omitted and the following components have been added: NPN transistor Q3, Diode D4, resistor R5, variable resistor R6, resistor R7, resistor R8, and capacitor C6. Components C4, D1, R1, C1, C2, Q1, D2, R4 and C5 perform the same function as previously explained in connection with FIG. 1. As seen, the collector of Q1 is coupled to the base of Q3 by way of resistor R7 and the collector of Q3 is connected to the gate of Q2. Diode D4 is connected to lead 27 and its cathode is coupled to the collector of Q3 and to the gate of Q2 by way of C6 and R8 and to lead 29 by way of R3. The cathod of D4 also is coupled to the collector of Q1 and to the base of Q3 by way of R5 and R6. The emitters of Q1 and Q3 are connected to lead 29.

When switch S1 is opened to turn "OFF" lamp B1, and as the voltage on power line L1 goes through the beginning of its positive half cycle (with reference to power line L2), capacitor C6 beings to charge. As will be discussed later, the direction in which the charge current of C6 is "steered" will determine whether lamp B1 will be "ON" or "OFF" after opening S1.

Transistor Q3 controls the direction in which the charge current of C6 is steered. If Q3 is "OFF", C6 begins to charge through diode D4, resistor R8, gate-cathode of Q2, turning Q2 "ON", and in turn turning "ON" lamp B1 for the remainder of the positive half cycle of the voltage on L1. When Q2 is turned "ON", capacitor C6 will discharge through resistors R5, R6, R7, base-emitter junction of Q3 and resistors R3 and R8. At the beginning of the next positive half cycle, C6 once again begins to charge and the same sequence of events is repeated. The charge path of C6 will remain the same as long as transistor Q3 remains "OFF".

Transistor Q3 is controlled by transistor Q1, and they are so connected such that whenever Q1 is "ON" Q3 is "OFF" and when Q1 is "OFF" Q3 is "ON". Transistor Q1 in turn is controlled by timing capacitor C1 whose function was explained previously. As C1 is accumulating a charge during a timing interval, Q1 is being turned "ON" during each positive half cycle of the voltage on the power line, and is therefore keeping Q3 from being turned "ON", and allowing B1 to be "ON" through anode to cathode of Q2.

When C1 becomes fully charged, the timing interval ends and Q1 can no longer come "ON". The base of Q3 is now receiving the current that previously was being shunted away by the collector-emitter of Q1 when it was "ON". Q3 can now turn "ON" at the beginning of each positive half cycle of the voltage on the power line. The base current to turn "ON" Q3 goes through D4, R5, R6, R7 and the base-emitter junction of Q3. With Q3 now being "ON", the charge current of C6 is steered away from the gate of Q2 and now is routed through the collector-emitter of Q3. Q2 can no longer turn "ON" and therefore lamp B1 will be extinguished.

For as long as switch S1 is "OFF" and the timing interval is ended, Q3 will be turned "ON" throughout each succeeding positive half cycle of the voltage on the power line, thus keeping Q2 and lamp B1 "OFF". Capacitor C6 likewise will keep the same charge path; charging through the collector-emitter of Q3; instead of through the gate-cathode of Q2.

The discharge path of C6 remains the same as before, however since Q2 is no longer being turned "ON", C6 will begin to discharge at such time that the voltage on the power line L1 begins its positive swing down toward zero voltage.

Changing the value of R6 will affect the loading of timing capacitor C1, and thus R6 becomes a means of adjusting the timing interval. R5 is a current limiting resistor for R6. R7 is used to help isolate C1 from the circuitry of Q3 and resistor R8 limits the charge current of C6. Diode D4 prevents reverse current from attempting to flow through Q1 and Q3 when the voltage on power line L1 becomes negative with reference to L2.

There are several advantages that the circuit of FIG. 4 has over the circuit of FIG. 1. In the circuit of FIG. 1, the collector-emitter of Q1 is exposed to the full power line voltage when switch S1 is opened and the timing interval is over. This necessitates that Q1 be a high voltage transistor, which makes it a more expensive device. In the circuit of FIG. 4, however, neither Q1 or Q3 has to withstand the full power line voltage under similar conditions, because of the way they are connected in the circuit. The combined price of Q1 and Q3 is less than that for one high voltage Q1.

The noise immunity of the circuit of FIG. 4 is considerably higher than that of FIG. 1, allowing the omission of diode D3 and capacitor C3 which were used in the circuit of FIG. 1 to give it a higher noise immunity. The higher noise immunity realized by the circuit of FIG. 4 is attributed to transistor Q3 being "ON" after switch S1 has opened and the timing interval is over. Through practically the entire time that the voltage on power line L1 is going through its positive half cycle, Q3 is "ON", absorbing any noise pulse that would otherwise gate Q2 "ON". Noise pulses appearing at the gate of Q2 when the voltage on power line L1 is negative and Q3 is "OFF", will not gate Q2 "ON" since the anodecathode of Q2 is of the opposite polarity required to turn it "ON". With the addition of Q3 in the circuit of FIG. 4, Q1 is buffered, allowing a higher overall gain, thus requiring a smaller value of capacitor C1 for a given time delay period.

In the embodiment of FIG. 4, the quick discharge circuit of FIG. 2 comprising switch S1a and leads 35 and 37, may be substituted for the quick discharge circuit 33.

It is to be understood that the light switch delay circuit of the embodiments of FIGS. 1, 2 or 4 could be made an integral part of the light switch S1.

I claim:

1. A delay circuit adapted to be connected across a light switch for maintaining an electric light bulb on for a given time after the switch has been opened, and wherein the switch has two terminals connected to two leads respectively to which A.C. voltage is applied, with the bulb being connected to one of said leads, said delay circuit comprising:
   a first lead adapted to be connected to one terminal of the switch,
   a second lead adapted to be connected to the other terminal of the switch,
   a switching element having an anode, a cathode, and a gate with its anode and cathode connected to said first and second leads respectively for turning the bulb on when said switching element is on and the switch is open,
   a capacitor having one terminal coupled to said first lead,
   an electronic gate coupled to the other terminal of said capacitor and having its output coupled to the gate of said switching element for turning said switching element on when said electronic gate is turned on as said capacitor charges when the switch is opened,
   said capacitor being charged during each positive portion of each cycle of the A.C. voltage following opening of the switch until it is fully charged,
   said electronic gate being turned on at later periods during each succeeding positive portion of each cycle of the A.C. voltage following opening of the switch until said capacitor is fully charged at which time said electronic gate will no longer turn on,
   diode means coupled to said first lead for preventing said capacitor from discharging during the negative portion of each cycle, and
   a quick discharge circuit for discharging said capacitor when the switch is closed,
   said quick discharge circuit comprising:
      a blocking diode having its anode connected to said first lead between said diode means and said capacitor, and
      a resistor and capacitor connected in parallel to the cathode of said blocking diode and to said second lead.

2. The delay circuit of claim 1, wherein said switching element comprises a silicon controlled rectifier.

3. The delay circuit of claim 1, wherein:
   said electronic gate comprises an NPN transistor having its collector coupled to said first lead, its base coupled to said other terminal of said capacitor, and its emitter coupled to said gate of said switching element.

4. The delay circuit of claims 1, 2, or 3, comprising:
   a variable resistor coupled to said electronic gate for varying the charging time of said capacitor coupled to said first lead and to said electronic gate.

5. A delay circuit adapted to be connected across a light switch for maintaining an electric light bulb on for a given time after the switch has been opened, and wherein the switch has two terminals connected to two leads respectively to which A.C. voltage is applied, with the bulb being connected to one of said leads, said delay circuit comprising:
   a first lead adapted to be connected to one terminal of the switch,
   a second lead adapted to be connected to the other terminal of the switch,
   a switching element having an anode, a cathode, and a gate with its anode and cathode connected to said first and second leads respectively for turning the bulb on when said switching element is on and the switch is open,
   a first capacitor having one terminal coupled to said first lead,
   a first electronic gate having its output coupled to the gate of said switching element,
   a second electronic gate coupled to the other terminal of said first capacitor and having its output coupled to said first electronic gate for turning said first electronic gate off when said second electronic gate is turned on as said first capacitor charges when the switch is opened,
   said first electronic gate being controlled by said second electronic gate such that when said second electronic gate is on said first electronic gate is off and when said second electronic gate is off said first electronic gate is on, said first capacitor being charged during each positive portion of each cycle of the A.C. voltage following opening of the switch until it is fully charged, said second electronic gate being turned on at later periods during each succeeding positive portion of each cycle of the A.C. voltage following opening of the switch until said first capacitor is fully charged at which time said second electronic gate will no longer turn on, diode means coupled to said first lead for preventing said first capacitor from discharging during the negative portion of each cycle, and a second capacitor having one terminal coupled to said first lead and to the output of said second electronic gate, the other terminal of said second capacitor being coupled to said gate of said switching element and to said second lead, when said first electronic gate is off when the switch is open, said second capacitor being allowed to be charged through the gate of said switching element during the positive portion of each cycle to turn said switching element on, when said first electronic gate is on when said switch is open, the charge current of said second capacitor being routed through said first electronic gate thereby turning said switching element off.

6. The delay circuit of claim 5 wherein said switching element comprises a silicon controlled rectifier.

7. The delay circuit of claim 5, wherein:

said first electronic gate comprises an NPN transistor having its collector coupled to the gate of said switching circuit, to said second lead and to said other terminal of said second capacitor and having its emitter coupled to said second lead, said second electronic gate comprising an NPN transistor having its collector coupled to the base of said NPN transistor forming said first electronic gate and to said one terminal of said second capacitor, its emitter coupled to said second lead, and its base coupled to said other terminal of said first capacitor.

8. The delay circuit of claim 5, comprising:

a variable resistor coupled to said second electronic gate for varying the charging time of said first capacitor.

9. The delay circuit of claims 5, 6, 7 or 8, comprising:

a quick discharge circuit for discharging said first capacitor when the switch is closed, said quick discharge circuit comprising:

a blocking diode having its anode connected to said first lead between said diode means and said first capacitor, and a resistor and capacitor connected in parallel to the cathode of said blocking diode and to said second lead.

10. The delay circuit of claims 5, 6, 7 or 8, comprising:

a quick discharge circuit for discharging said first capacitor when the switch is closed, said quick discharge circuit comprising:

a second switch having one terminal adapted to be connected to one of said leads to which A.C. voltage is applied and a second terminal connected to said first lead between said diode means and said first capacitor.

* * * * *